May 17, 1955 S. J. BEGUN ET AL 2,708,694
HUM BUCKING MAGNETIC RECORD TRANSDUCING HEADS
Filed July 30, 1946 4 Sheets-Sheet 1
FIG 1
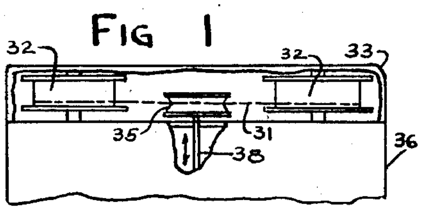
FIG 1-B
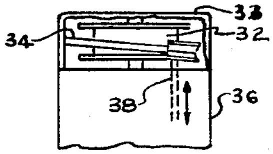
FIG 1-A
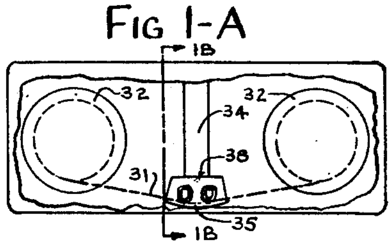
FIG 2
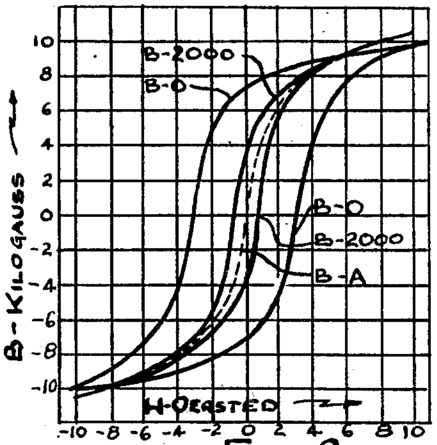
FIG 2-A
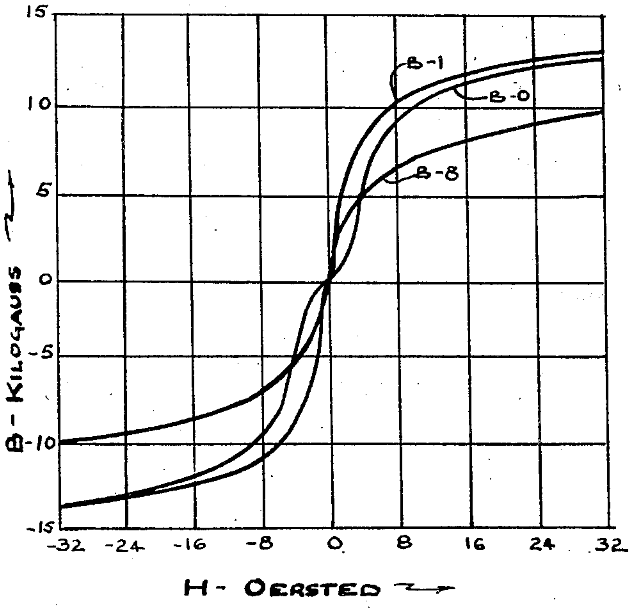
FIG 3
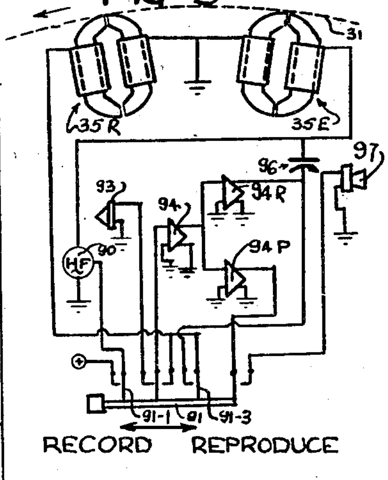
INVENTORS
A.P. DANK & S.J. BEGUN
BY Pirles & Greene
ATTORNEYS May 17, 1955 S. J. BEGUN ET AL 2,708,694

HUM BUCKING MAGNETIC RECORD TRANSDUCING HEADS

Filed July 30, 1946 4 Sheets-Sheet 2

INVENTORS
A.P. DANK & S.J. BEGUN
BY Pirlea & Greene
attorneys

May 17, 1955 S. J. BEGUN ET AL 2,708,694
HUM BUCKING MAGNETIC RECORD TRANSDUCING HEADS
Filed July 30, 1946 4 Sheets-Sheet 3
Fig. 5
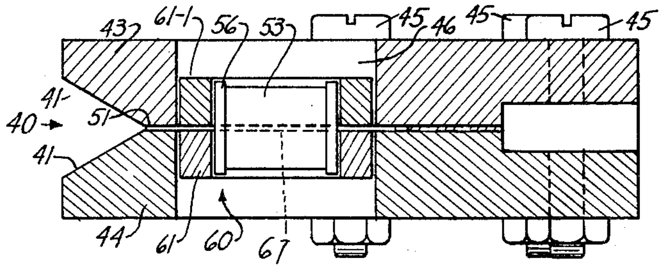
Fig. 5-A
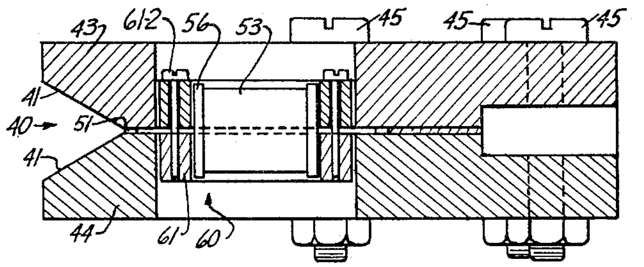
INVENTORS
A. P. DANK & S. J. BEGUN
BY Pinelles & Greene
attorneys INVENTORS
A. P. DANK & S. J. BEGUN
BY Pirelli & Greene
ATTORNEYS United States Patent Office 2,708,694
Patented May 17, 1955

2,708,694

HUM BUCKING MAGNETIC RECORD TRANSDUCING HEADS

Semi Joseph Begun, Cleveland Heights, and Alfred P. Dank, Euclid, Ohio, assignors, by mesne assignments, to Clevite Corporation, Cleveland, Ohio, a corporation of Ohio Application July 30, 1946, Serial No. 687,047

4 Claims. (Cl. 179—100.2)

This application is a continuation-in-part of application Serial No. 454,688, filed August 13, 1942, now abandoned, and application Serial No. 550,570, filed August 22, 1944, now abandoned.

This invention relates to magnetic record transducing heads which are used for magnetically recording signals on and reproducing signals from an elongated magnetic record track by magnetic linkage between the windings of the record transducing head and successive elements of the magnetic record track bridging the pole gap of the magnetic core of the transducing head.

Practically every magnetic recording apparatus utilizes a power energized electric motor, and in some cases also other auxiliaries, which are energized by low-frequency alternating power current and produce generally-homogeneous stray magnetic leakage fields of the low alternating current frequency. Such external stray field flux tends to penetrate the core and the windings of the transducing head and induce therein a low frequency hum which is very objectionable in reproducing magnetic records. Various expedients have been proposed to reduce the disturbing effects of such stray field such as hum bucking coils and magnetic shielding. However, they make the apparatus more complex, are often not satisfactory, and add considerably to the expense and weight of the apparatus.

The present invention overcomes the foregoing difficulties by the provision of a magnetic record transducing head having a core and windings which are electromagnetically balanced so as to buck out and minimize the effect of stray homogeneous flux without substantially reducing the effectiveness of the head in reproducing magnetic records or in recording signals. In accordance with the invention, such hum bucking head comprises a substantially closed loop-like magnetic core having at least one pair of non-magnetic gaps of substantially equal reluctance, subdividing the core into a pair of magnetically opposite core paths each of substantially equal reluctance, the transducing windings interlinked with the core being divided into two winding portions surrounding the two respectively opposite core paths so that any homogeneous stray magnetic or electric fields induce in the head structure effects which are substantially 180 degrees out of phase and cancel each other without substantially impairing its operation in reproducing magnetic records from successive portions of a magnetic record track impelled past the pole gap or recording magnetic signals on such track.

Prior art unbalanced heads, which are affected by stray fields in reproducing, usually establish undesired external fields when used for recording. Such external fields interfere with any reproducing head operating close thereto. Balanced heads of the invention do no exhibit this deficiency and are therefore also of advantage when used for recording.

The foregoing and other objects of the invention will be best understood from the following description of exemplifications thereof, reference being had to the accompanying drawings wherein Fig. 1 is a diagrammatic side view of a magnetic wire recording device with parts broken away;

Fig. 1–A is a similar top view of the device shown in Fig. 1;

Fig. 1–B is a cross-sectional view along the line 1B—1B of the device shown in Fig. 1;

Figs. 2 and 2–A are explanatory curve diagrams showing the effect of superposed alternating current on the hysteresis loop and magnetization curves, respectively, of magnetic material;

Fig. 3 illustrates in diagrammatic form one method of operating a recording apparatus of the invention using A. C. bias.

Fig. 5 is a cross-sectional view along line 5—5 of the transducer head of Fig. 4;

Figure 4:
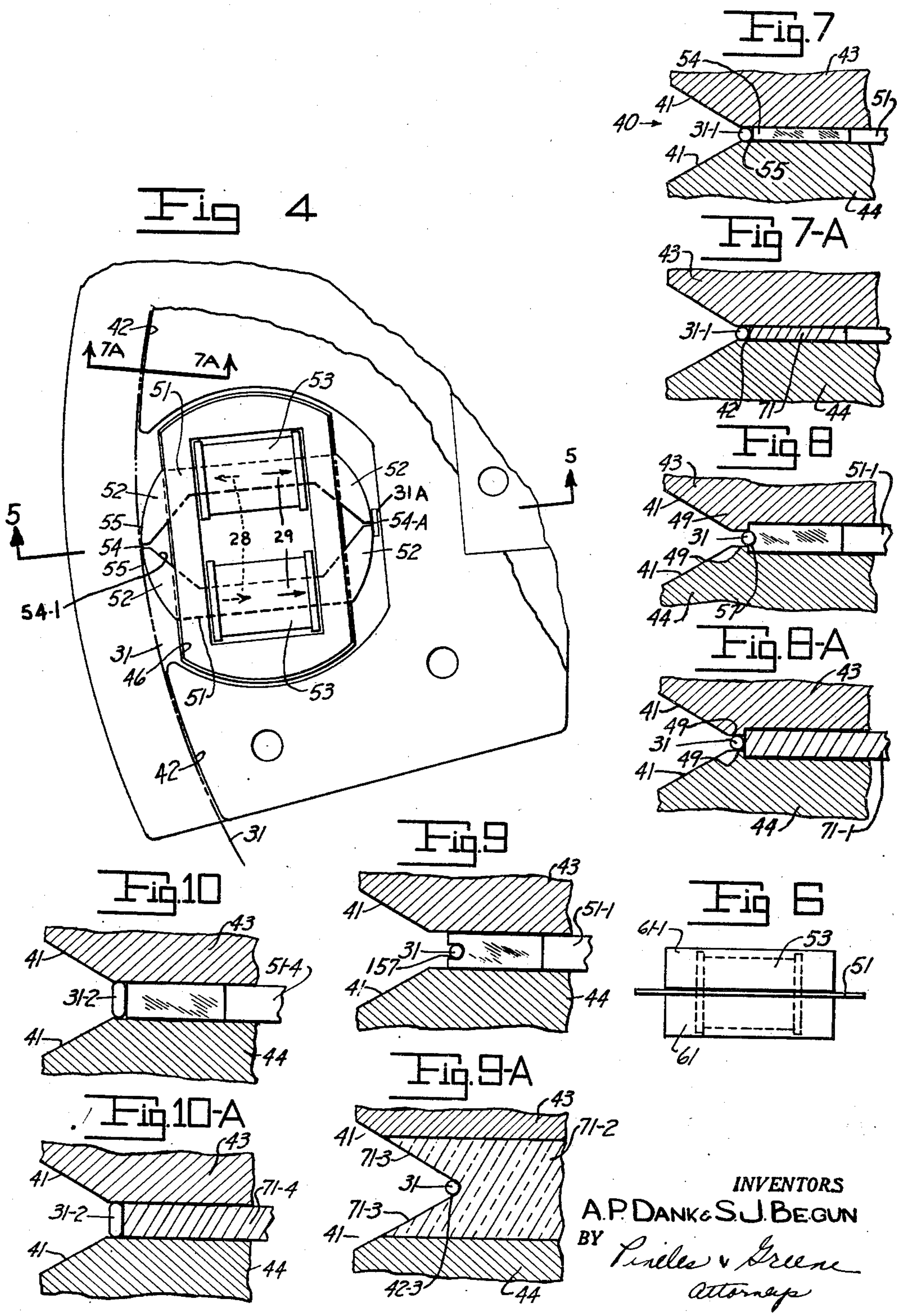
Fig. 4 is a top view of a magnetic transducer head with the top wall removed.
Figures 11, 12, 13, 14, 16:
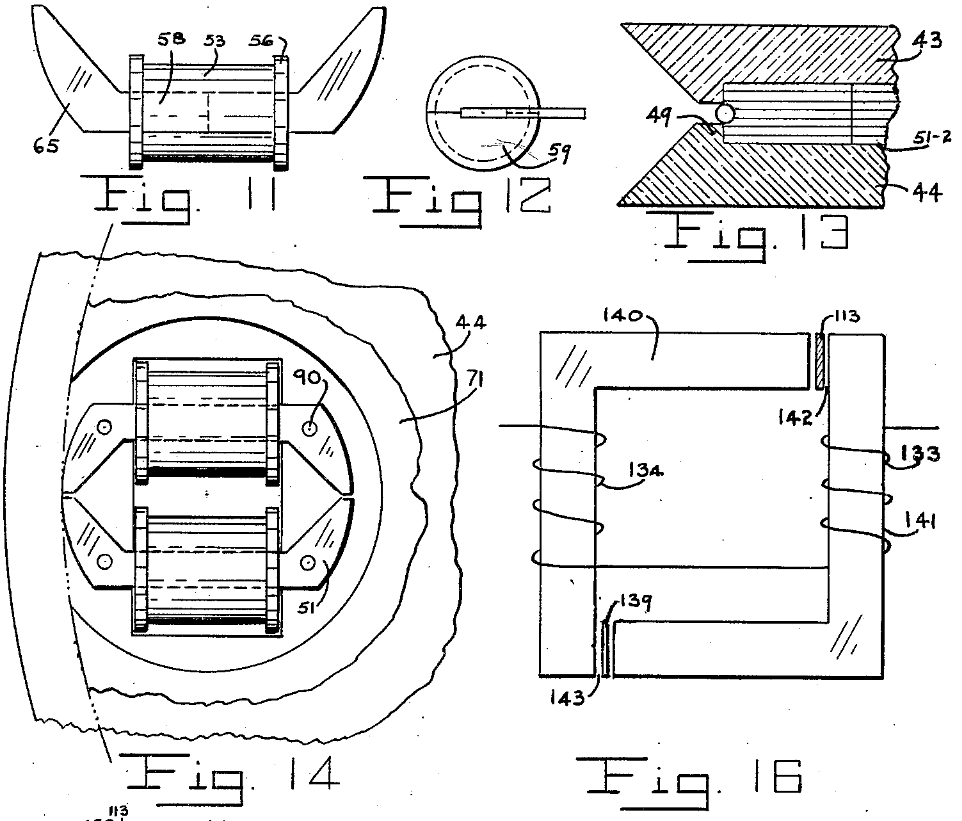
Figure 17:
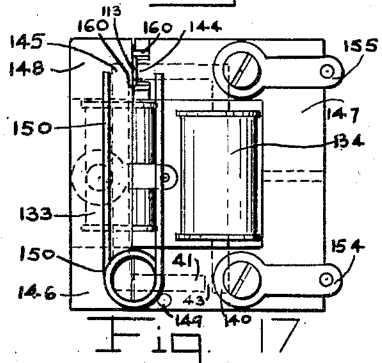
Figure 15:
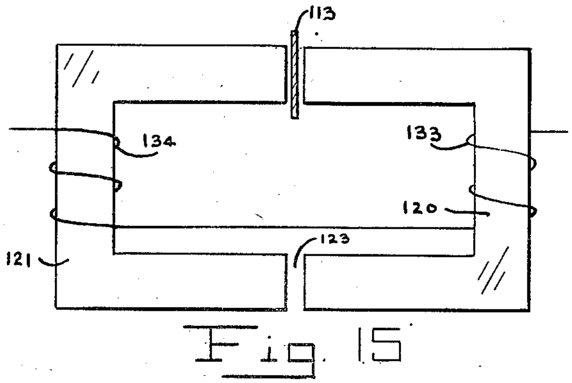
Figure 18:
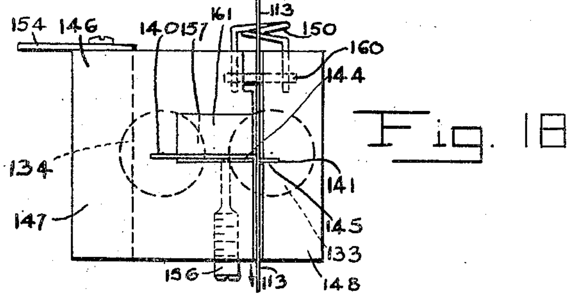

Fig. 5–A is a view similar to Fig. 5 of a modified constructional form;

Fig. 6 is a side elevational view of the double pole-piece unit of the transducer head of Fig. 4;

Fig. 7 is a cross-sectional view similar to Fig. 5 of the pole face region of the double pole-piece unit of the transducer head of Figs. 4 and 5;

Fig. 7–A is a cross-sectional view of the guide channel element of the transducer head along line 7A—7A of Fig. 4;

Figs. 8 and 8–A are views similar to Figs. 7 and 7–A of a modified construction;

Figs. 9 and 9–A are views similar to Figs. 7 and 7–A of another modified construction;

Figs. 10 and 10–A are views similar to Figs. 7 and 7–A of a further modified construction;

Figs. 11 and 12 are top and side views, respectively, of a pole piece unit of Figs. 4 and 5;

Fig. 13 is a view similar to Figs. 7 and 8 of a modified form of construction;

Fig. 14 is a view similar to Fig. 4 of a modified form of magnetic head exemplifying the invention;

Fig. 15 is a diagrammatic view of a modified transducing head of the invention for use with a magnetic record track in the form of a tape;

Fig. 16 is a diagrammatic view of a further modified transducing head of the type shown in Fig. 15; and Figs. 17 and 18 are side and top views, respectively, of a transducing head shown diagrammatically in Fig. 16.

In the transducing of the invention, the magnetic core of the transducing head is composed of two like core units each equipped with a transducing winding and so arranged that interfering homogeneous stray electric and magnetic fields induce potentials in each unit that are substantially in opposite phase and accordingly cancel out. The disturbing effect of stray 60-cycle electric fields, which are always present because of the omnipresence of commercial power supply lines, and stray magnetic flux contributed by transformers, relays, or other highly-magnetized elements, are thus minimized. The windings are interconnected so that the flux induced by current in one winding produces a magnetic flux in the same direction as the current in the other, and the desired fluxes reinforce each other even though undesired fluxes cancel out.

In Figs. 1, 1–A, and 1–B is shown diagrammatically one form of a magnetic recording and reproducing arrangement combined with a transducer head arrangement of the invention.

A long, spirally-coiled, magnetic signal recording track, in the form of a magnetic steel recording wire or filament 31, is stored on two reels 32 which are revolvably mounted in a self-supporting reel holder unit, shown in the form of a casing 33, so that by rotating one reel the wire will be wound thereon while it is being unwound from the other reel.

The recording wire 31 is maintained under tension and is guided through a magnetic transducer head 35 which is shown carried by a substantially rigid, flat arm 34 having a rear end portion pivotally secured to a portion of the holder casing 33 so as to make it possible to impart to the magnetic head assembly 35 an up-and-down oscillatory or reciprocatory motion for distributing the recording wire 31 along the height of a reel 32 while it is being wound thereon from the other reel.

The holder casing 33 is arranged for detachable coupling to a motor unit 36 so that either one of the reels 32 may be selectively rotated for winding thereon the magnetic recording wire 31, while assuring that the wire 31 is always held under tension. The motor unit 36 has a cam, not shown, which rotates at a speed correlated to the rotary motion of the reels 32, and the cam imparts through a follower rod 38 the required up-and-down oscillatory motion to the transducer head assembly 35 which is held biased against the upwardly projecting end of the follower rod, as by a biasing spring forming part of the pivotal connection between the arm 34 and the wall of the holder casing 33.

Various magnetic transducer head arrangements for magnetic recording and reproducing have been suggested in the past. The transducer head arrangement most commonly used in the past employed two magnetic pole pieces spaced by an extremely small magnetic gap and placed on the opposite sides of a moving signal carrier, such as a wire or tape, and windings interlinked with the pole pieces carried the electric signals to be recorded or picked up.

Such magnetic heads have, however, been superseded by so-called ring-type magnetic transducer heads which use ring-like or closed-circuit magnetic cores provided with a magnetic gap and placed with the gap tangentially on one side of the moving record track so as to magnetically interlink the transducer head windings surrounding the core with a moving element of the record track bridging the magnetic gap. The use of such magnetic heads for magnetically recording with magnetic tapes or wires is described in the two German A. E. G. Patents 617,796, issued in 1935, and 660,337, issued in 1938, and the desirable operating characteristics of such ring-type magnetic heads have been described in an article by H. Lubeck, published in "Akustische Zeitschrift" of November 1937, pages 273–297.

It was also long known that in recording magnetic signals, a better signal to noise ratio is obtained if, in lieu of a D. C. biasing current, a high-frequency alternating biasing current is superposed on the recording current, as described, for instance, in the U. S. Patent 1,640,881 of Carlson et al.

The superiority of recording with A. C. biasing current is probably due to the phenomenon illustrated by the curves of Figs. 2 and 2–A. Fig. 2 illustrates the effect of superimposing high-frequency alternating fields on the hysteresis loop of magnetic material obtained in the absence of superposed alternating current magnetization. Curve B–2000 is a hysteresis loop of the same magnetic material obtained when the magnetic material was subjected to an alternating magnetizing current which produced an alternating magnetic flux having an induction of 2,000 Gauss. A further increase of the alternating magnetization results in the loop entirely collapsing into a line curve B—A shown in dash lines.

In Fig. 2–A are shown magnetization curves of magnetic material under superposed alternating fields. Curve B–0 is a magnetizing curve of the magnetic material obtained in the absence of a superposed alternating field, and this curve has a sharp knee in the region below and above zero. Curves B–1 and B–8 show the magnetization curves of the same material obtained while a smaller or larger alternating field was superposed on the material. These curves show that the apparent maximum permeability reaches a maximum, as indicated by curve B–1, as the alternating flux increases, and that further increase of the alternating flux results in a decrease of the permeability, as indicated by curve B–8.

Since magnetic recording is generally used for recording audible frequencies, the superposed alternating biasing field is so chosen that its frequency is above the audible range, such as about 20,000 cycles.

Fig. 3 illustrates in diagrammatic form one practical method of operating a magnetic recording system in accordance with the invention wherein A. C. biasing is used for recording. The recording medium 31 in moving from one reel to another, is guided past the pole face region of an erasing head 35E and the pole face region of a recording or play-back head 35R. Both heads may be mounted in the head assembly 35 and may be equipped with a channel or groove so as to assist in guiding the moving record track. A switch 91 having four poles and two positions is connected so that in the Record position (left-hand position as shown) one pole 91–1 connects a high-frequency oscillator 90 with a source of power, indicated by the circled plus sign; another pole 91–2 connects microphone 93 with the input side of amplifier 94, and pole 91–3 connects the output side of the secondary recording amplifier 94R with the recording head. The high-frequency currents are led to the erasing head directly, adjustable condenser 96 by-passing some of the high-frequency currents to the amplifier output to provide the necessary high-frequency A. C. bias to the signals being led to the recording head. The recording medium is subjected to a high-frequency magnetic flux as it passes the pole gap at head 35E. This flux is strong enough and has a frequency high enough to place the moving medium in a magnetically neutral condition. As the medium, now magnetically neutral passes the pole gap 54 at the recording head 35R, it is exposed to a magnetic flux corresponding to the signal current with superimposed high-frequency current, and successive portions become permanently magnetized and exhibit a magnetic flux which varies along the medium in accordance with the signal current variation with time. To play back the recording, the medium is rewound and then unreeled in the same sequence over the recording and play-back head 35R, with the switch 91 in the Reproduce position. The high-frequency source 90 and microphone 93 are disconnected, the head 35R is connected to the input amplifier 94, the output of which is connected to the reproducing device 97, which can be a loud speaker, through an intermediate secondary play-back amplifier 94P. The capacitor 96 is adjusted to present an impedance to the signal voltage sufficiently high to prevent the appearance of any appreciable signal flux in the erasing head 35E, although for the higher biasing frequency sufficient coupling is obtained.

The secondary amplifiers 94R and 94P may be used to control the recording and play-back amplitudes at the different frequencies in the desired range of frequencies so as to obtain higher fidelity.

The magnetic transducer head of the present invention makes use of the fact that best results are obtained if a minimum of magnetic material is used in the magnetic circuit of such recording head.

The effectiveness of the magnetic recording and reproducing process depends on the cooperative maintenance of stable operating conditions between the diminutive magnetic gap region of the magnetic transducer head and the diminutive magnetic record track element bridging the gap. These conditions are extremely critical, and the difficulties encountered in their operation are greatly increased when the recording and reproducing process is carried on on a thin wire or filament, and particularly when the magnetic head is also utilized for distributing the wire as it is being transported from one reel to the other.

In all types of magnetic transducer heads, the short length of the moving signal carrier, which is magnetically interlinked with the transducer head core, may be designated as the effective magnetic slit and it differs somewhat from the actual magnetic gap extending between the tips of the pole pieces. The magnetic slit width which determines the effectiveness of the magnetic recording process, depends on the magnetic field distribution in the region between the diminutive pole-piece gap and the record track element bridging the gap, and this field distribution is determined by the character of the contact conditions between the pole pieces and the moving magnetic record element in the region of the diminutive gap.

A further important factor responsible for the critical difficulties encountered in the magnetic recording process is the fact that the transducer heads require pole pieces made of a metal having a high permeability or Mu, the magnetic sheet material of the pole pieces being in most cases a special nickel-iron alloy. These alloys have to be properly annealed in order to give them their high Mu characteristics. Any stresses imparted to such material after annealing will change its magnetic performance characteristics.

When the magnetic recording process is carried on with a wire, additional critical conditions are created by the fact that the wire, on moving over the pole pieces, wears into the relatively soft magnetic pole-piece material a groove. As a result, erratic magnetic conditions develop in the critical magnetic gap region of the pole pieces.

The magnetic transducer head arrangements of the invention, the novel features of which will be described hereinafter in connection with various exemplifications thereof, make it possible to manufacture magnetic transducer heads that are very effective in recording on wire, producing a high signal-to-noise ratio, without requiring very careful shielding or individual adjustment of each head, and such heads of the invention have proven effective in overcoming the various critical difficulties of the prior magnetic transducer heads.

The magnetic transducer head assembly 35 is shown in detail in Figs. 4 to 10–A and constitutes a substantially rigid, generally flat, block-like guide structure provided on one elongated side with an elongated guide channel 40 having two outwardly-tapering guide surfaces 41 extending from an elongated, narrow channel 42 forming the deepest region of the guide channel 40. The elongated, narrow channel 42 has a width of the order of the thickness of the signal carrier filament 31 and is so designed as to serve as a positive elongated guide surface which engagingly supports and guides a substantial length of the filamentary recording track 31 as it moves through the transducer head.

In the arrangement shown, the block-like guide structure of the transducer head 35 is formed by two wall members 43, 44, held suitably clamped to each other, as by a plurality of screws 45, and holding therebetween an assembly of two, thin, flat pole pieces 51 and transducer windings shown formed of two coils 53 mounted on and interlinked with the magnetic core structure formed by the two pole pieces. The magnetic transducer head shown is intended for recording as well as for reproducing, and its thin, flat pole pieces 51 are of highly-permeable magnetic sheet material. The thickness of the pole pieces is of the order of the thickness of the wire filament 31. The two pole pieces 51 are held longitudinally aligned in a plane on the opposite sides of a narrow, non-magnetic gap 54 of the order of .001 inch width.

The outwardly-facing edge surfaces of the pole pieces which border the gap 54 are convexly curved so as to constitute two elongated pole faces 55 arranged to be tangentially engaged by a portion of the magnetic recording wire filament 31 moving past the gap 54.

Since the magnetic material of the pole pieces is much softer than the material of steel wires of the type used as filamentary magnetic recording tracks, the motion of such recording wire on the softer magnetic pole-piece material wears away the magnetic material of the pole pieces, and will, after a period of use, form in the pole faces 55 a groove 57, such as is shown in Fig. 8, which supports the wire 31 better than a flat pole-face surface. In making magnetic recording heads of the type shown, the central flat surface region of the elongated pole faces 55 is preshaped or pregrooved for assuring that the moving wire filament is guided along the central region of the narrow pole-face edge surfaces 55. The larger contact area so produced diminishes the rate of erosion of the pole pieces and helps to maintain a substantially constant magnetic linkage between the record track and the magnetic gap and pole pieces. When recording on a wire which is about .003 to .006 inch thick, the pole pieces may be made about twice the thickness of the wire, for instance, about .010 to .014 inch thick, and not more than about 20 mils.

In order to maintain uniform operating conditions for a long period of operation during which the pole-face portions 55 of the pole pieces 51 are worn out, the narrow magnetic gap region 54 adjoining the pole faces 55 is made by substantially parallel, facing edge portions of the pole-piece ends so as to provide an outer, parallel, narrow gap region of substantially uniform magnetic reluctance which does not materially change even if the wire wears a deep groove in the pole face region 55 of the pole pieces 51 along which it moves.

Each of the two transducer winding coils 53 is wound on a block-like bobbin member 56 having a slit 67 in which the pole piece 51 is placed so that the bobbin body serves as a mechanically strong support for its associated pole piece 51.

In recording, the recording signal currents traversing the transducer coil 53 impress on the successive elements of the moving magnetic recording filament 31 bridging the recording gap 54, corresponding magnetizing forces which convert it into a succession of elemental magnets or magnet waves corresponding to the recorded signal currents. In reproducing, the coercive magneto-motive forces of the succession of magnetic record waves passing the pole-piece gap 54, force through the core structure of the pole pieces 51 and its surrounding windings 53 corresponding magnetic flux waves which induce in the transducer windings 53 voltage waves corresponding to the recorded signals.

In the reproducing process, it is important to assure that the gap region 54 extending between the edges of the pole-piece ends facing the gap 54 shall not shunt away the magnetic flux waves which are induced in the pole pieces by the successive magnetic wave elements of the record filament 31 moving past the gap 54. To this end, the edges of the pole portions are tapered along their inward region to provide a wide tapered gap region 54—1 having relatively great reluctance compared to the magnetic path of the core structure which is interlinked with the transducer winding 53.

The two bobbin members 56, with the pole pieces 51 held therein, are shown united to a common mounting member shown in the form of a ring 61 so as to constitute therewith a self-supporting, detachably removable, double pole-piece unit holding its pole pieces assembled in their proper operative relationship. This mounting may be effected by cementing, using a thin layer of cement having a high curing temperature, such as commercially available synthetic resin cements which may be cured and hardened at relatively high temperatures, such as 200° C., under pressure of the order of six pounds per square inch. The mounting member 61 may be made of a suitable molded synthetic resin material which is stable against humidity and temperature changes, synthetic resin materials having one or more layers of fabric impregnated with a suitable resin being particularly suitable. The ring 61—1 may be of brass or other metal, and mounted by cementing, spot welding, or soldering the pole pieces 51 to the metal ring directly. Although not necessary, an overlying ring 61—1 is shown in Figs. 5 and 5–A as completing the double pole-piece unit. The ring 61—1 may be secured as indicated for mounting the ring 61 or by clamping the two rings together by means such as the screws 61—2, shown in Fig. 5–A. Both rings 61 and 61—1 may be metallic, it having been discovered that no significant eddy current losses take place so long as the metallic rings are kept far enough away from the non-magnetic gap. The spot welding operation has also been found not to significantly affect the magnetic properties of the core.

The double pole-piece unit is arranged to be held between the wall members 43, 44 of the magnetic head structure 35, with the two aligned pole faces 55 exposed along an intermediate portion of the narrow channel track 42 in such manner as to expose the pole faces 55 into operative engagement with the elements of the record track filament 31 moving and guided along the narrow channel track 42. The outwardly tapered guide surfaces 41 of the guide channel structure 40 are so designed that a tensioned length of the signal carrier track 31, which is biased toward the channel structure 40, is automatically guided by the guide surfaces into positive guiding engagement with the long, narrow channel track 42 forming the deepest part of the channel structure. The taper of the guide surfaces 41 is so designed and correlated to the shape of the narrow channel track 42 as to cause a thickened track element, such as a splice joining two ends of a wire forming the record track, to be lifted outwardly from the narrow channel track 42 and cause the splice to ride along the outward regions of the tapered deflecting surfaces 41, while moving through the transducer head. In addition, the taper of the guide surfaces 41 is so chosen that the guide surfaces present to a wire protrusion deflected thereby a support which prevents forces exerted by the tensioned moving wire 31 from wedging a wire protrusion within the narrow inward region of the guide channel 40.

As shown in Fig. 7–A, the bottom of the narrow guide channel track 42 is shown formed by the narrow edge surface of a sheet 71 of hard material, such as Phosphor bronze, which is held clamped between the two wall members 43, 44 so that the narrow edge surface of the sheet member 71 is exposed along the deepest region of the guide channel 40 and serves as the guide support of the narrow guide channel track 42. The sheet member 71, which provides the guide surface of the guide channel track, is of substantially the same thickness as the sheet material of the pole pieces 51 and is held aligned with them between the two wall members 43, 44.

As indicated in Figs. 8 and 8–A, which are enlarged transverse cross-sections of the pole-piece region and the guide track region of the transducer head of another embodiment of the invention, the thickness of the sheet material of the pole pieces 51—1 and of the guide sheet 71—1 is made of the order of twice the thickness of the cross-sectional width of the recording track 31, and the facing sides of the two rigid wall members 43, 44, which hold them in their operative position, are provided with wall protrusions overlapping the edges 55 of the pole pieces 51 and the guide sheet 71 so as to form a channel 49 to guide the narrow magnetic record track filament 31 along the central region of the narrow edge surface of the pole pieces 51 and the guide sheet 71. The wall portions 49, 49 may be omitted, as shown in Fig. 9, and the groove in the pole pieces deepened, as indicated by 157, to assist in guiding the wire. The guiding insert 71 may also be made wider, as shown in Fig. 9–A by member 71—2, the guiding face of 71—2 being then shaped to form a guiding groove 71—3.

In the transducer head arrangement shown in Figs. 4 to 12, the coil bobbin structure 56 of each of the pole pieces 51 is utilized to form a firm support for its thin pole piece. This is particularly important if highly-permeable magnetic material is used for the core structure of the pole pieces.

The slit 67 in each bobbin 56 may be made large enough to admit the entire pole piece 51. With the pole-piece construction illustrated, however, difficulties may arise if the pole piece is to be inserted after winding the coil 53 on the bobbin. The bobbin, according to a modified construction, may have a slit only wide enough to admit the straight shank portion 58. Fig. 11 illustrates such a construction, in which the pole piece is made in two equal half-units 65 which are inserted into the slit from opposite ends either before or after winding the coil. A more closely fitting slit makes for a bobbin of increased strength having a greater support for the pole pieces.

Instead of making the bobbin structure 56 of one piece, it may be made of two longitudinal halves with a pole-piece recess on an inwardly facing side of the two bobbin halves, and they may be united to each other around the pole piece 51 so as to form a spool-like structure around which the coil may be wound. There are available a number of synthetic resin materials which do not undergo material dimensional variations under changing temperature and humidity conditions, and such moldable synthetic resin materials may be used for molding bobbin members 56.

Both spool halves may be made of the same shape, and the two matching halves may be cemented to each other on the opposite sides of the pole pieces, a flat recess between the facing wall surfaces of the two spool halves providing the elongated space within which the flat pole piece is firmly retained and protected. Either or both bobbin sections may be made of a non-magnetic metal, the eddy current loss being kept low when the metal section or sections are sufficiently shorter than the pole piece. Fig. 12 shows such a construction, wherein the lower bobbin section 59 is metallic.

When two such bobbin half-structures are united to the opposite sides of the pole pieces held between them and to each other by cementing in the manner described above for the ring mountings 61 or other appropriate means, they constitute a firm, rigid pole-piece bobbin unit which has a great degree of stability and which does not require any careful handling when winding thereon the coil, or in assembling it, by mass production methods, into the transducer structure. The cementing is also very effective in providing an insulating layer between the pole piece and metallic portions joining it, such as one-half of the bobbin structure, for instance, when the bobbin section 59 is made out of metal.

Furthermore, such high-temperature curing synthetic cements may be also used for laminating a plurality of thin pole-piece laminations into a pole piece of over-all thickness of the order of the recording track, such as .006 to .014 inch.

The two pole-piece bobbin units so united to the common mounting member 61 form a self-supporting double pole-piece unit which maintains all critical elements of the transducer structure in their critically aligned, stable operating conditions. The double pole-piece unit is arranged to be held within the substantially rigid supporting structure shown formed by two wall members 43, 44, having in their interior a cavity space 45 within which the assembled double pole-piece bobbin unit is firmly held in its operative position so as to expose the pole faces 55 adjoining the operative gap 54 to portions of the magnetic recording track as it moves over the channel track 42, in the manner indicated in Fig. 4.

Thin spacer layers of compressible material, such as a rubber-like material, may be placed on the inner surfaces of the wall members 42, 42 facing the cavity to permit the self-supporting double pole-piece assembly to assume its proper position within the cavity without subjecting the end portion of the pole pieces which is clamped between the two wall members to excessive strains.

It should be noted that the cross-section of the magnetic recording filament 31 need not be made circular, as in ordinary wires, but may have a flat tape-like form, in the manner shown in Figs. 10 and 10–A. It has been found that magnetic heads of the invention of the type described herein are very effective in recording or reproducing signals with magnetic recording filaments of either round or flat cross-section. According to a further modification of the invention, the magnetic record track may be in the form of a flat tape, in which case the pole-piece construction may also be flat, as shown in the copending application of Otto Kornei, Serial No. 685,092, filed July 20, 1946, and entitled "Magnetic Recording and Reproducing." Additionally, several pole pieces of the kind illustrated in Figs. 7, 8, or 10 may be superimposed so that the total thickness of the superposed units is equal to the desired width of a magnetic track to be utilized in the form of tape. This laminated construction has been found to give excellent results with magnetic tapes that are either metallic, or limp coated non-metals such as paper, or limp self-sustaining films containing dispersed magnetic powder.

In the transducer head shown, each pole piece 51 is surrounded with its coil 53 and is so arranged that it forms one-half of a balanced, substantially closed, magnetic circuit including two like gaps 54, 54–A. Each pole piece and surrounding coil unit is alike, preferably identical, and the two coils of a single head are connected together oppositely (front-to-back) so that the flux induced by the flow of recording current in one coil reinforces that induced by the same current in the other, as shown by arrows 28—28 in Fig. 4. Since the windings are physically parallel, any homogeneous stray magnetic or electric fields external to the coils will induce a flux in one pole piece that opposes and will substantially cancel that in the other, as shown by arrows 29—29. By making the magnetic core and the windings symmetrical and balanced with respect to the two gaps, such disturbances are balanced out. The symmetry is seen in the fact that for every portion of the magnetic circuit in the core, there is another equal or balancing portion on the opposite side of the circuit. This is of the nature of radial symmetry in the plane of the core, around its center and having two radii. Induction in the magnetic leg containing the gap 54, for example, is opposed by an equal flux induced in the leg containing the gap 54–A when the gaps have the same reluctance. To secure perfect balance, the opposite gap 54–A may be bridged by a magnetic element 31–A proportioned so as to be equivalent in its effect to the magnetic signal carrier element bridging the effective gap region 54 along which the record track 31 is impelled during the recording and reproducing process.

The magnetic head shown in Figs. 4 to 10 is very effective in suppressing disturbing leakage fluxes and cross-talk.

As shown in Figs. 4, 5, 8, 9 and 10, the end portions of the two pole pieces 51 bordering the gap region 54 project in front of the bobbin body 56 so that the exposed portions of the aligned pole pieces 51 bordering the gap region may be positively engaged and held in their operative position along the guide channel track 42 by the overlying parallel surface portions of the wall members 43, 44 extending inwardly from the channel track region 42 along which the pole faces 55 are exposed.

Contrary to expectations, it has been found that a magnetic record transducing head of the type described above, using a balanced magnetic core structure, operates very efficiently for recording with high-frequency biasing currents, notwithstanding the fact that the magnetic pole pieces are united by soldering to a common, rigid, metallic mounting member, such as the mounting member 61 shown in Figs. 4 and 5, and no difficulties are encountered due to eddy currents that are induced by magnetic stray fields induced by such high-frequency biasing currents traversing the windings of the coils 53.

Furthermore, it has been found that a transducer head arrangement of the type described above in connection with Figs. 5 to 11 is also very efficient in obliterating signals of a record track 31 moving past the pole-piece region if the coils 53 are excited with a high-frequency obliterating current of the proper magnitude. Such heads have been found very effective in obliterating records made on wires having a diameter of about six mils when using an obliterating current of a frequency of about 20,000 cycles per second.

In order to obliterate with A. C. flux, the apparatus is so arranged as to produce an A. C. obliterating flux of such character that when a record track moves past the pole gap along the channel track 42 of the transducer head, each record track element passes through an A. C. obliterating field which is so distributed that the record track is first subjected to saturation and then subjected to a decaying alternating magnetic field which restores it to a neutral condition. The frequency of the obliterating current sent through the coil winding is so related to the speed of the record track 31 that the magnetic field produced in the pole gap extends along a path equal to a substantial number of wave-lengths of the obliterating field.

As described in Fig. 3, two heads may be mounted on a head assembly 35, one head being used for erasing and the other for recording and playing back.

The magnetic record transducing head described above embodies a number of important features. The length of the narrow track channels 42 extending on both sides of the aligned pole faces 55 is made sufficiently greater than the length of the pole faces 55 engaged by the moving filament 31, and their relative surface levels and shapes are so designed and correlated as to suppress vibrations of the filament element bridging the gap and the transmission of vibrations along the moving filament toward the filament element bridging the gap.

This arrangement assures that the magnetic recording filament, such as a magnetic steel wire, in moving from one reel to another, is led between the tapering guide surfaces 41 of the guide channel 40 into tangential engagement with the narrow channel 42 to assure that the short intermediate portion of a long, positively guided and supported filament length 31, bridging the critical gap region 54 separating the pole faces 55 of the pole-piece structure, is maintained in a vibration-free condition, and that uniform magnetic conditions prevail in the magnetic slit region which focuses and concentrates the magnetic recording and reproducing flux interlinking the short filament element bridging the magnetic slit with the double pole-piece core structure. Furthermore, any propagation of vibrations of the wire resulting from the unwinding and winding-on operations while the wire passes through the head, is suppressed.

The elongated pole-face edge-surface portions of the pole piece 55, which form the two longitudinally-aligned pole faces 55 of the pole pieces 51, are preshaped so as to form therein elongated concave pole-face channels 57 and assure that the wire remains centered in the elongated central region of the narrow edge-surface portions forming the pole faces 55. The walls of the guide structure to which the pole pieces are secured, are made of a non-magnetic material which does not undergo material variations with changes in humidity and temperature for assuring that the critical magnetic material of the pole pieces 51 is not subjected to strains which impair or vary its magnetic characteristics.

A suitable ceramic or synthetic resin material may be used for the guide channel structure. If the magnetic head is used for recording with direct current bias, a non-magnetic metal of high electrical resistance, such as chrome alloys, may be used for the guide channel structure.

The major area of the elongated channel 42 along which the wire is led towards and away from the magnetic pole faces 55, is formed of non-magnetic material and shaped so as not to introduce any disturbance into the magnetic signal stored in the magnetic signal-carrier filament 31.

Furthermore, the surface material of the channel 42 extending on both sides of the aligned pole-face portions 55, is of a sufficiently greater hardness than the material of the pole pieces 51, and their level is so positioned relatively to the level of the pole faces 55 as to reduce the specific pressure exerted by the filament on the pole faces 55 and to keep it materially smaller than the specific pressure exerted by said filament on the adjoining portions of the record track channel 42.

It has been found in practice that very effective magnetic transducer heads of the invention, suitable for magnetic recording with A. C. biasing and obliterating current, may be made with flat pole pieces, each of which is formed of a single magnetic sheet lamination, in the manner indicated in Fig. 4, and having a thickness of approximately the same order of magnitude as the thickness of the magnetic wire 31.

In magnetic recording applications involving the use of high-frequency erasing and biasing currents, or recording, and the reproduction of high-frequency signals, undesirable eddy currents may be more fully suppressed by making each of the pole pieces 51, or, in general, each of the magnetic core elements of the magnetic transducer head, from a plurality of laminations which are as thin as practically possible. The erasing head may be identical with the transducing head although the very high permeability core is not required for erasing. Silicon steel makes a magnetic core which provides excellent erasing. When recording with a head not used for playback, silicon steel also functions efficiently.

Fig. 13 shows a magnetic transducer head of the type described above having pole pieces 51—2, each of which is formed of a plurality of superposed thin laminations. The over-all thickness of the pole pieces 51—2 is about twice the thickness of the recording filament 31, and the thickness of each lamination is a fraction of the thickness of the recording filament 31. The two pole pieces 51—2 are shown secured in their proper operating position between two side walls 43, 44 of the guide channel structure. Furthermore, as in the arrangement of Fig. 8, the inward region of the channel side walls 43, 44 is provided with wall protrusions 49 which overlap the edges of the pole faces so as to positively guide the moving wire 31 along the center region of the elongated pole faces in the manner explained above.

In order to assure that the two pole pieces are rigidly supported in their proper operative position with the required gap spacing within the transducer head, the two pole pieces are suitably secured and united to at least one rigid mounting member so that they constitute with such mounting member a substantially rigid, self-supporting, unitary, double pole-piece structure.

One or both of the wall members 43, 44 of the guide channel structure, or a rigid part thereof, may be utilized as the rigid supporting body to which the two pole pieces are secured and united in their properly-aligned position so as to constitute therewith a rigid, self-supporting, double pole-piece unit. If the magnetic head is used for recording with D. C. biasing current, the two properly-aligned pole pieces 51 may be united to a rigid, non-magnetic metal member of high electrical resistance by soldering or by an electrical welding process. If a rigid non-metallic member is used as the supporting wall, the two properly-aligned pole pieces 51 may be affixed thereto by a suitable cement. Alternatively, the two aligned pole pieces 51 may be clamped and united to a rigid support in their properly-assembled, aligned positions by clamping them between two rigid non-magnetic walls of high electrical resistance, as by means of thin non-magnetic screws, such as thin watchmaker screws joining the two walls and extending through a central region of the flat pole pieces. The pole pieces may have apertures which are aligned on these or other screws or on separate aligning pins.

Fig. 14 illustrates such a construction, in which the pole pieces 51 are mounted directly on one of the wall members 44 by means of the aligning pins 90, there being properly located apertures in the pole pieces which snugly fit the pins and hold the pole pieces in suitable relation for the desired gap spacing. When the other wall member 43 is fastened in place, the pole pieces are securely held in their proper alignment. The pins 90 may be made long enough to also act as positioning means for the overlying wall 43. Small non-magnetic screws may be substituted for the pins, as indicated above, recesses being then provided in the overlying wall member to accommodate the heads of the screws.

In making a double pole-piece structure by soldering the pole-piece elements to a rigid, ring-shaped, supporting structure in the manner described above, it is important to use a soldering material with a low fusion temperature in order to assure that the heating accompanying the soldering operation does not affect the magnetic characteristics of the pole-piece material. The initial pole-face channel should be formed on the two aligned pole faces after they are united to their rigid supporting structure, and the pole pieces have to be annealed before they are soldered to the support and before their aligned pole faces are subjected to the pole-face channel shaping operation which should be performed with low forces to assure that the magnetic pole-piece material is not subjected to disturbing strains.

Alternatively, the magnetic pole-piece elements may be secured to their supporting structure by a high-temperature treatment, such as an electric welding process, and the materials of the supporting structure as well as the bobbins and windings are so chosen that they may be subjected together with the magnetic pole pieces united thereto to the annealing process without in any way deleteriously affecting the magnetic characteristics of the pole pieces. Alternatively, the supporting structure may be made sectional, the sections to which the pole pieces are attached permitting the subsequent winding of the coil on the bobbin; the high-temperature pole piece fastening treatment being followed by annealing to obtain the desired high permeability, after which the coils are wound and the sections assembled without a high-temperature operation.

The over-all thickness of the pole-piece portions having the pole faces 55 may be made large enough so as to provide on both sides of the pole-face channel 57 narrow wall portions of highly-permeable magnetic material having a thickness required for maintaining the moving wire in a uniform magnetic condition with respect to the pole-face portions of the pole pieces. Thus, when using, for instance, a magnetic signal-carrier wire 31 which is six mils thick, very good and uniform operating results are obtained with pole pieces 51 made from a magnetically, highly-permeable sheet about .012 inch thick and containing in the pole faces 55 channels 57 .006 inch wide, so that the moving wire shall fit between the highly-magnetic channel wall portions which are .003 inch thick.

In order to secure good efficiency in the reproducing process and maintain uniform operating conditions for a long period of operation during which the pole-face channels 57 may be deepened as a result of wear, the magnetic gap formed between the end-edge surfaces of the pole pieces 51 facing the gap has an outer, parallel, gap region 54 of substantially uniform magnetic reluctance and an adjoining, inner, divergent gap region of greatly increased magnetic reluctance. The inward distance of the parallel gap region 54 is made sufficient to permit the pole-face channel to wear in deeper without significantly changing the magnetic flux interlinkage conditions between the wire element 31 bridging the gap 54 and the adjacent pole-face portions 55.

By using a magnetic core structure and pole pieces of highly-permeable magnetic sheet material having a thickness of the order of the thickness of the thin magnetic recording wire, such as from one-half to about four times the thickness of the wire, a magnetic transducer head of the type here described is very effective for magnetic recording with A. C. biasing and obliterating current, and the eddy current losses in the magnetic material of the core structure are kept down to a practically negligible level suitable for general practical use. Such magnetic head construction is also very effective for magnetic recording on wire with D. C. biasing and obliterating current.

The wall material of the guide surfaces 41 should be of a character which exhibits great wear resistance and toughness. Various commercially available, non-magnetic, electrically-insulating, molded synthetic materials, such as molded phenolic condensation products, have the toughness required for this purpose. Ceramic guide surfaces also have the desired properties.

When used for recording with D. C. biasing current, the guide surface members may be made of metal, and the guide surfaces 41 may be provided with a hardened guide-surface layer, for instance, by alloying the surface of the metal with a layer of hard wear-resisting material, such as chromium, which withstands wear when it is traversed by a steel wire protrusion. Alternatively, the hardened surface layer may be formed on the guide surfaces of the guide members by a plating process. The exposed pole faces 55 of the pole pieces 51 may be likewise provided with a surface layer of hard wear-resisting material formed thereon by a plating process.

Fig. 15 illustrates another form of a transducer head based on the principles of the invention. Two generally U-shaped, like magnetic members 120 and 121 are mounted so that the free ends of one member 120 oppose those of the other member 121, as shown, to form one non-magnetic gap through which a magnetic record tape 13 passes and an additional balancing non-magnetic gap 123. Around the respective intermediate portions of the U-shaped members, the transducing windings 133 and 134 are placed and interconnected so that the turns of one are clockwise in series with the turns of the other, which are counter-clockwise. The magnetic record track 113 is passed through one of the gaps 122 which is just sufficiently large to accommodate the track.

Fig. 16 shows a slightly modified construction, in which the magnetic core is made of L-shaped, like magnetic members 140 and 141, but is otherwise similar, the gaps 142 and 143 being symmetrically situated.

In order to aid in the maintenance of substantially constant magnetic linkage between the magnetic record track and the pole pieces in spite of variations in the thickness of the track, as will unavoidably exist, for example, in a commercially produced track member or will exist where splices are made in the track, the magnetic core members may be biased toward each other, as, for example, by a spring. Very close and uniform gap conditions are thus maintained at the pole portions bounding the gap 122 or 142, and excellent results are obtained. In order to assure the proper spacing for the non-magnetic gap 123 or 143, a spacing member 139 may be interposed between the bounding faces of the core, as indicated in Fig. 16. The core may be made substantially perfectly symmetrical and balanced by using as the spacer 139 a magnetic member which duplicates at gap 143 the magnetic conditions produced by the magnetic record track 113 at gap 142. For this purpose, a piece of the record track may be employed as the spacer 139.

Figs. 17 and 18 are views of an actual transducing head embodying the two L-shaped pieces of magnetic material 140, 141, held in a Bakelite frame 146. The frame is comprised of two pieces 147 and 148 which are hinged together at the top by a hinge pin 149 extending in a conventional way through overlapping interfitting elements of the two frame members 147, 148. The two frame members 147 and 148 are biased toward each other at the bottom by a spring 150 having end portions engaging suitable holes in the two frame members. The frame piece 147 holds the L-shaped piece of magnetic material 140 which has pole piece 144, and the frame piece 148 holds the L-shaped piece of magnetic material 141 which has pole piece 145. The tape 113 is inserted between the pole piece tips 144, 145 after the bottom portions of the frame 147 and 148 are swung away from each other against the bias of the spring 150. The two frame portions 147, 148 and the two L-shaped pieces of the magnetic material thereby move with respect to each other about the hinge 149 to provide space for the tape 113. The opening 143 between two pieces 140, 141 of the magnetic material near the hinge 149, is sufficiently wide to provide clearance for the movement. When the frame portions are released, the spring 150 presses them against the tape, thereby keeping the pole pieces in close engagement with the tape.

Pins 160, 160 are provided for guiding the tape 113 as it goes into the head, and for aligning the two portions 147, 148 of the frame with respect to each other.

Terminals 154, 155 are provided for connecting the head into an electrical circuit, and the terminals are electrically connected to the wire in the coils 133, 134.

In the longitudinal recording and reproducing, one reproducing pole piece should be offset with respect to the other pole piece by the same amount of offset which was present in the recording pole pieces. Our head is well suited for obtaining that correct amount of offset, as we provide an adjustment screw 156 which is threaded into the Bakelite housing 146 and engages one of the pieces 140 of the magnetic material. On the opposite side of the magnetic material from the adjusting screw 156 is a pad 161 of damping material which engages the pole-piece tip 144. Screwing the adjusting screw into the housing causes the magnetic material to bend and move into the damping material, thereby adjusting the amount of offset between the pole-piece tips 144, 145. Thus, by trial and error, the operator can find the one position where the high-frequency response is best. The tape 113 moves through the head in the direction of the arrow shown in Fig. 18, thereby tending to push the pole piece 144 against the screw 156. If the direction of the movement of the tape were reversed, the friction between the tape and the pole piece would make the pole piece move into the damping pad 161. As the pad does not provide a rigid stop for the pole piece, it might vibrate back and forth, thereby continuously varying the pole-piece offset at the tape.

A practical consideration of great importance is that when a high Mu pole piece is bent, it loses much of its superior qualities. Accordingly, the adjusting screw 156 is positioned on one of the long legs of the magnetic material, in order that suitable offset between the tips can be obtained without stressing the material to the point where it loses its good qualities.

The present invention is directed only to the features of the invention claimed herein involving a hum-bucking magnetic record transducing head in which the loop-like magnetic core is subdivided by at least two opposite non-magnetic gaps of substantially equal reluctance into two core paths of substantially equal reluctance, each interlinked with one-half of divided windings arranged so as to minimize the effect of stray homogeneous fields while generating aiding outputs in response to magnetic fields induced in the core by successive portions of record track bridging the gap past which it moves.

The features of the invention disclosed herein and involving a magnetic record transducing head having a loop-like core, the pole portions of which are formed of a single thickness of magnetic sheet metal of the order of thickness of the record track, are claimed in the co-pending application Serial No. 687,046, filed July 30, 1946, as a continuation in part of application Serial No. 550,570, filed August 22, 1944, now abandoned.

The features of invention disclosed herein involving a magnetic record transducing head having a loop-like core formed of two distinct core legs projecting in opposite directions from surrounding windings and held in operative position across a non-magnetic transducing gap by a rigid mounting structure affixed to projecting leg portions, and from which mounting structure the gap-bordering pole portions of the core legs project into engagement with the record track, are claimed in the copending application Serial No. 688,738, filed August 6, 1946, as a continuation in part of application Serial No. 550,573, filed August 22, 1944, now abandoned.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

We claim:

1. A magnetic record transducing head for use with a magnetizable record member comprising: a first core portion; a second substantially similar core portion positioned with reference to said first core portion to form a substantially symmetrical closed loop-like magnetic core structure having only serially disposed portions and having two diametrically opposite air gaps; a first coil around said first core portion; a second substantially similar coil electrically connected in series with said first coil positioned around said second core portion diametrically opposite from said first coil and with its axis substantially parallel to the axis of said first coil to provide substantially equal and opposite voltages in said two coils for uniform stray magnetic fields when said record member is across one of said air gaps.

2. In a magnetic recording and reproducing apparatus for recording signals on and reproducing signals from a moving elongated flexible magnetic record track, a magnetic transducing head including a substantially closed, loop-like magnetic core structure and transducing winding magnetically linked with the core structure; said core structure having only serially disposed core portions and including at opposing portions two non-magnetic gaps of substantially equal reluctance; the core structure having a thickness and being approximately symmetrical in the plane of its thickness; the portion of the core structure defining one of the said non-magnetic gaps being adapted to contact the moving magnetic record track; the other non-magnetic gap being shunted by magnetic material which approximately duplicates the shunting of the said one of the gaps by the magnetic record track so as to produce substantially perfect symmetry; the transducing windings being in two approximately equal portions each having an imaginary magnetic axis; the axes of the transducing windings being approximately parallel and the windings being correspondingly linked with the core so that the total transducing head structure is electrically and magnetically substantially balanced and any components of homogeneous stray electrical or magnetic disturbances induce effects in the coils and magnetic circuit portions which are substantially 180° out of phase and substantially cancel each other.

3. In a magnetic recording and reproducing apparatus for recording signals on and reproducing signals from a moving elongated magnetic record track, a magnetic transducing head including a substantially closed, loop-like, magnetic core structure and transducing windings magnetically linked with the core structure; said core structure having only serially disposed core portions and including at opposing portions two non-magnetic gaps of substantially equal reluctance subdividing said core structure into two magnetic core sections magnetically approximately symmetrical with respect to said two gaps; the portion of the core structure defining one of the said non-magnetic gaps being adapted to contact the moving magnetic record track; the other non-magnetic gap being shunted by magnetic material which approximately dupilcates the shunting of the said one of the gaps by the magnetic record track so as to produce substantially perfect symmetry; the transducing windings being in two approximately equal portions surrounding said respective two core sections between said two gaps so that the transducing head structure is electrically and magnetically substantially balanced and any homogeneous stray electrical or magnetic disturbances induce effects in the windings and magnetic circuit portions which are substantially 180° out of phase and substantially cancel each other.

4. In a magnetic recording and reproducing head, a substantially closed, loop-like magnetic core having a pair of confronting pole pieces defining therebetween a main air gap and an auxiliary air gap of substantially equal reluctance and providing a path through said main air gap for a traveling magnetic recording medium, said core having only serially disposed core portions and providing two substantially parallel flux paths for components of stray flux in any direction in the plane of said core, a divided winding on said core comprising a plurality of coils mounted upon said core with their magnetic axes in substantially parallel spaced relation and parallel to the plane of said main air gap, said coils being connected in aiding relation to establish flux in said core whereby substantially equal and opposite voltages are induced in said coils by components of stray flux in a direction substantially parallel to said axes, and a magnetic shunt bridging said auxiliary air gap proportioned to lower the reluctance of said auxiliary air gap to substantially the reluctance of said main air gap shunted by said medium whereby the voltages induced in said coils by substantially homogeneous components of stray flux in a direction substantially perpendicular to said axes in the plane of said core are rendered substantially equal and opposite; said divided winding portions being connected to generate aiding output corresponding to the magnetic field induced in said core by a magnetic recording medium in flux linkage relationship to the core portions defining said main air gap.

References Cited in the file of this patent

UNITED STATES PATENTS

| | | |
|---|---|---|
| 1,883,561 | Chipman | Oct. 18, 1932 |
| 2,048,487 | Begun | July 21, 1936 |
| 2,233,621 | Lovell | Mar. 4, 1941 |
| 2,351,003 | Camras | June 13, 1944 |
| 2,493,742 | Begun | Jan. 10, 1950 |

FOREIGN PATENTS

| | | |
|---|---|---|
| 221,638 | Switzerland | Sept. 1, 1942 |
| 622,623 | Germany | Dec. 2, 1935 |
| 725,830 | Germany | Sept. 30, 1942 |